Sept. 11, 1956　　　O. HESS　　　2,762,324
HIGH-SPEED SEWING MACHINE WITH PRESSURE FEED LUBRICATION
Filed Oct. 24, 1952.　　　8 Sheets-Sheet 1

INVENTOR
OTTO HESS
By Young, Emery & Thompson Attys.

Sept. 11, 1956     O. HESS     2,762,324
HIGH-SPEED SEWING MACHINE WITH PRESSURE FEED LUBRICATION
Filed Oct. 24, 1952     8 Sheets-Sheet 3

INVENTOR
OTTO HESS
By Young, Emery & Thompson ATTYS.

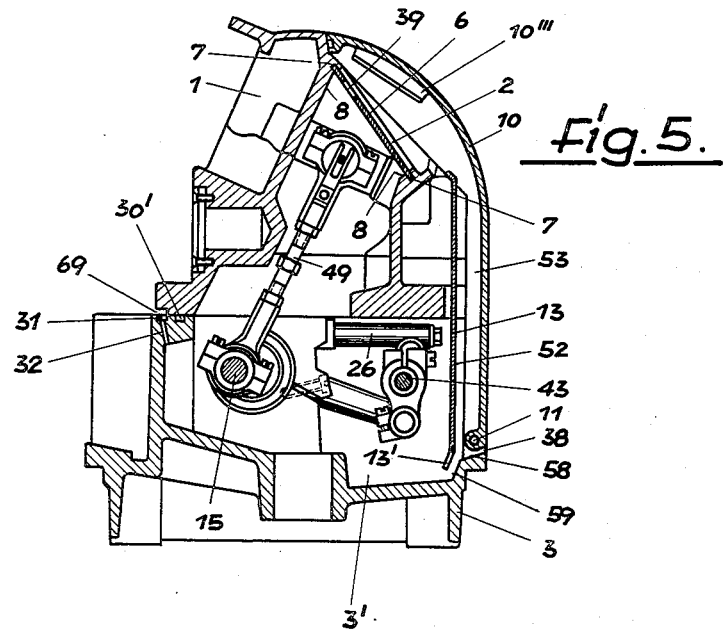

Sept. 11, 1956  O. HESS  2,762,324
HIGH-SPEED SEWING MACHINE WITH PRESSURE FEED LUBRICATION
Filed Oct. 24, 1952  8 Sheets-Sheet 5
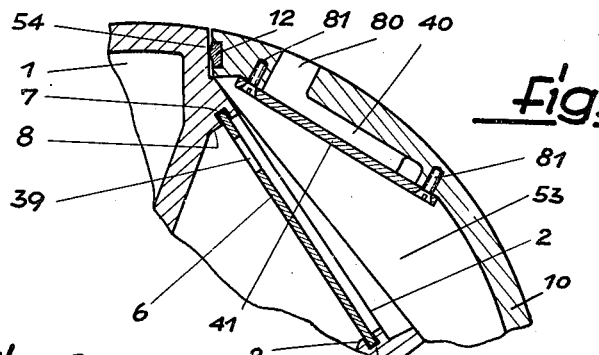
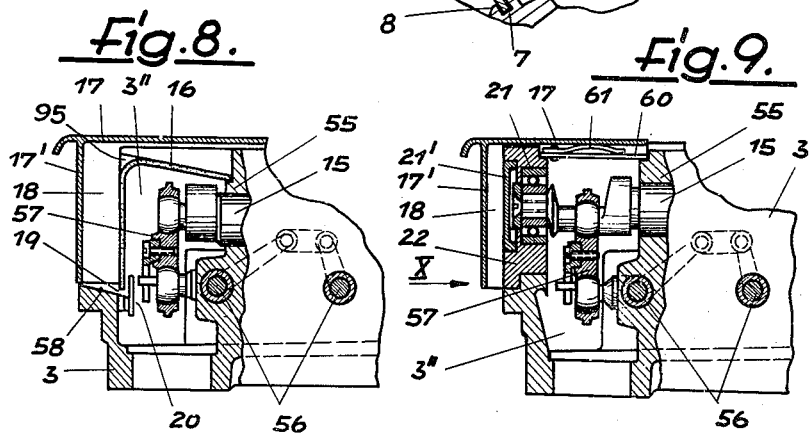
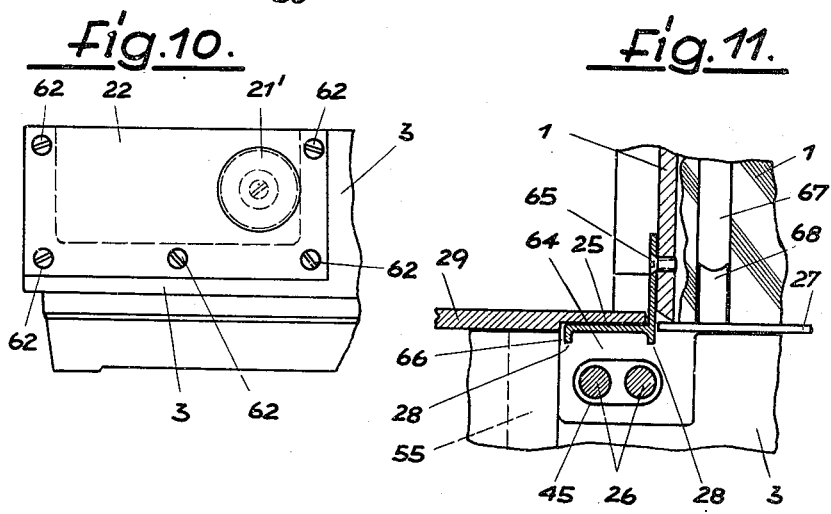
INVENTOR
OTTO HESS
By Young, Emery & Thompson
Atty's.

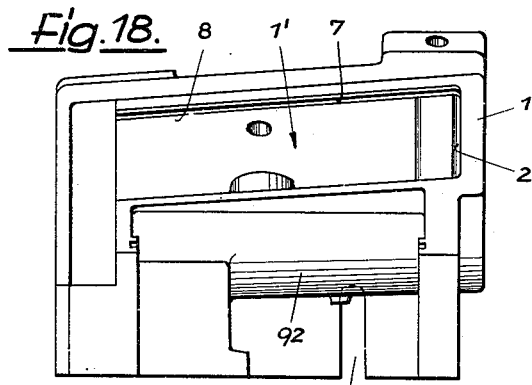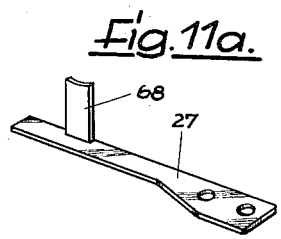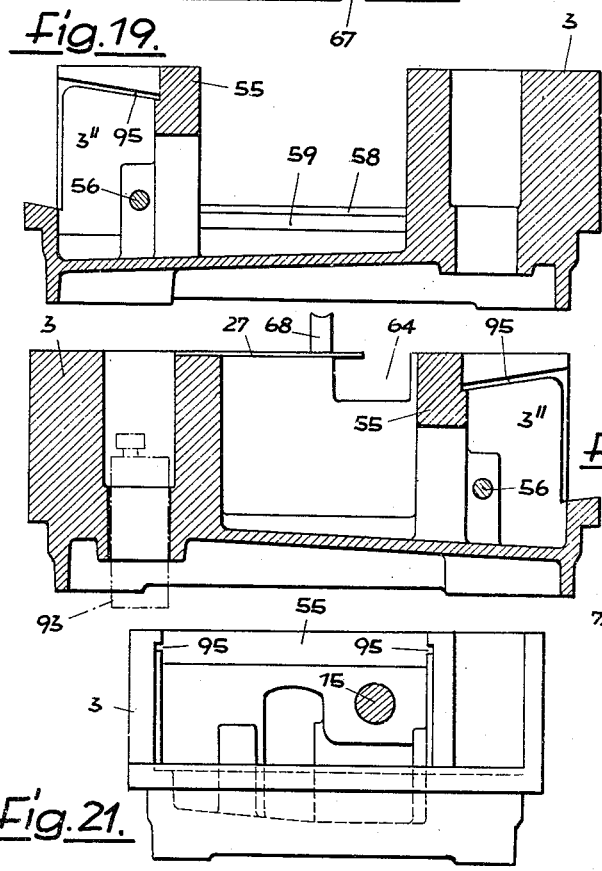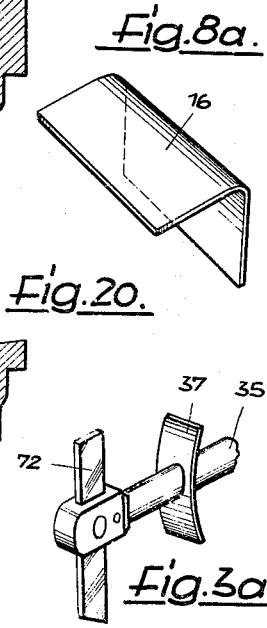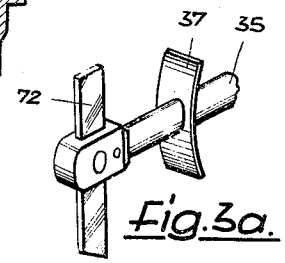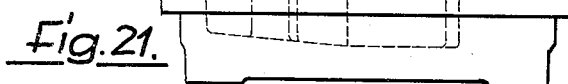

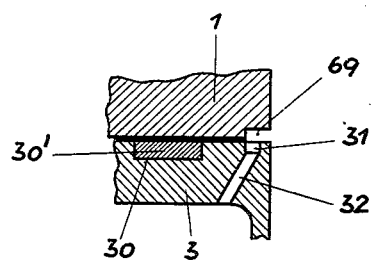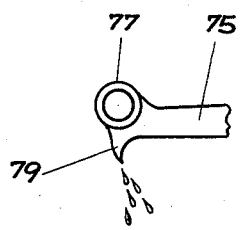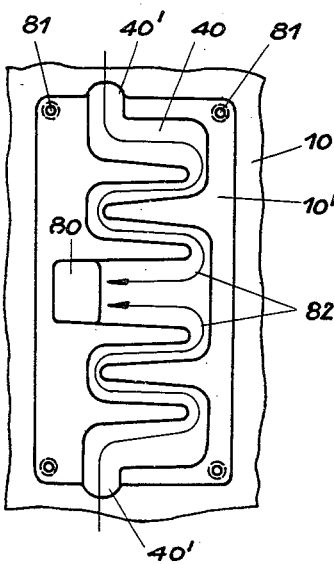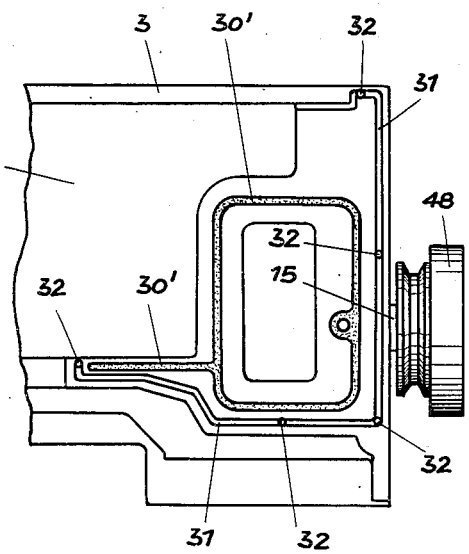

Sept. 11, 1956      O. HESS      2,762,324
HIGH-SPEED SEWING MACHINE WITH PRESSURE FEED LUBRICATION
Filed Oct. 24, 1952      8 Sheets-Sheet 8

INVENTOR
OTTO HESS
By: Young, Emery & Thompson
Attys.

United States Patent Office 2,762,324
Patented Sept. 11, 1956

2,762,324

HIGH-SPEED SEWING MACHINE WITH PRESSURE FEED LUBRICATION

Otto Hess, Ludwigsburg, Wurttemberg, Germany

Application October 24, 1952, Serial No. 316,676

Claims priority, application Germany October 27, 1951

3 Claims. (Cl. 112—256)

The invention relates to a high-speed sewing machine with pressure feed lubrication.

The very high number of revolutions and stitches of the sewing machine increases the risk of oil coming through and soiling the sewing material. Owing to the heat arising inside the machine at a high number of revolutions an overpressure is produced forcing the oil outward in spite of the provided packings. Moreover the oil will get misty and the oil mist will be forced through the openings necessary at the machine, for instance the knife lever, the feed dogs or the loopers, that is near the sewing material, so that there is the risk of the material being soiled by oil. Moreover the oil mist will deposit at the machine and get to the sewing material.

It is an object of the invention to prevent the oil from getting out of the casing in which the driving mechanism works and therefore oil will be spilled or get misty.

It is particularly an object of the invention to make sure that the spots at which oil might get through are reliably secured against a passing through of oil and that there does not occur an inadmissible high temperature inside the machine.

A further object of the invention is to provide at the concerned spots at least two oil catchers in the form of covering devices arranged behind each other and to return the oil received by the outer catching device by means of a running down surface or other devices sloping, for instance, into the interior of the machine casing and to receive the small amount of oil which could flow through the inner covering device by way of the outer covering device so that it cannot get to the sewing material.

A further object of the invention is to avoid the arising of the detrimental heat in the interior of the machine by providing in the lower section of the casing at least one inlet for cold air and in the upper section of the casing at least one outlet for the heated air mixed with oil mist kept back by special means.

This invention will be better understood by referring to the accompanying drawings which illustrate a sewing machine embodying the features of the invention and in which drawings.

Figure 1:
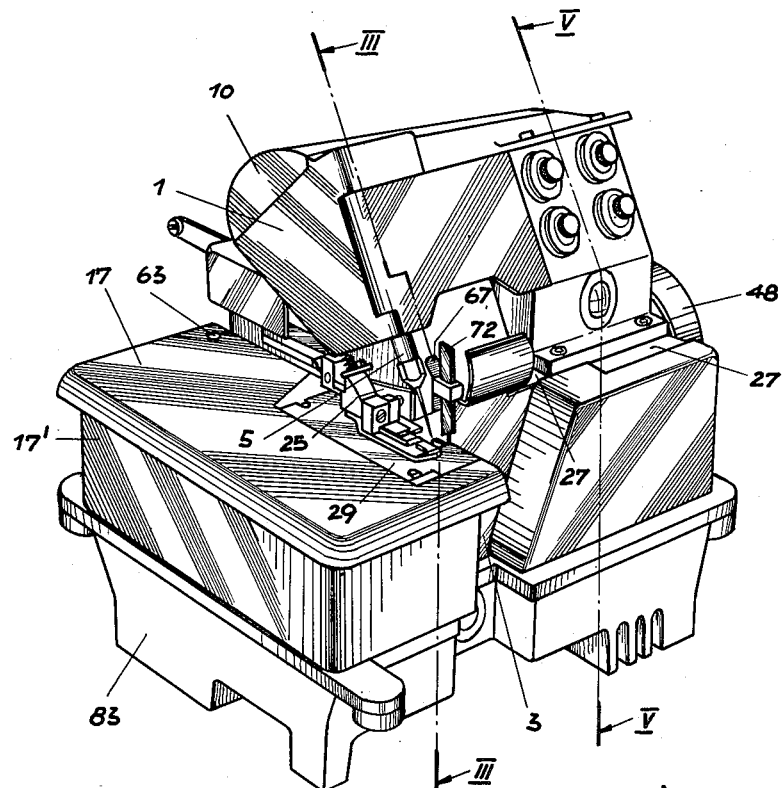
Fig. 1 is a perspective view of the sewing machine.
Figure 2:
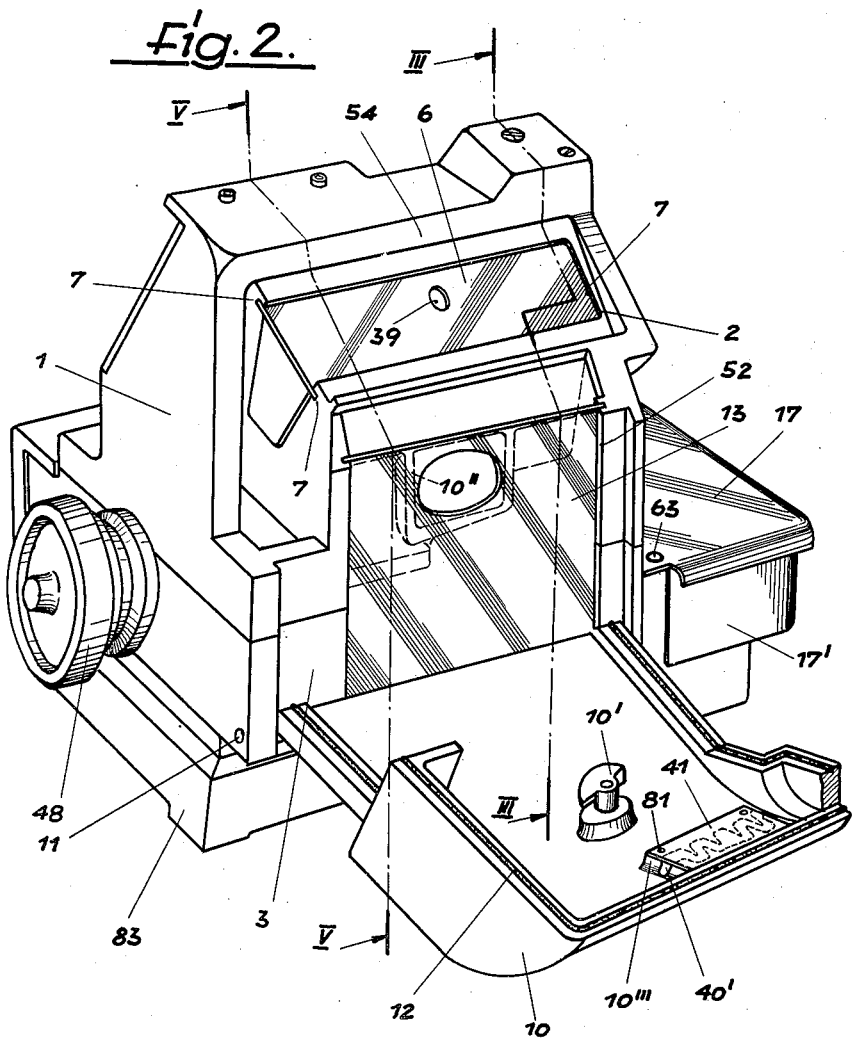
Fig. 2 is a perspective view of the rear of the sewing machine.
Figure 3:
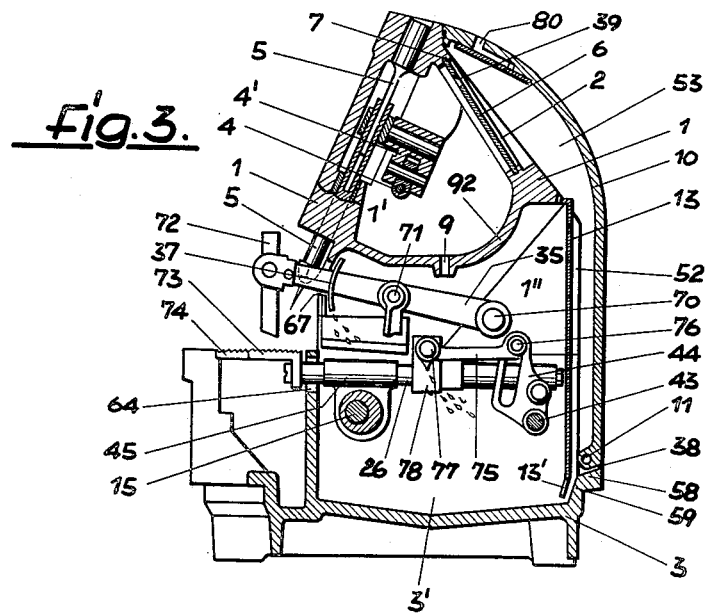
Figure 4:
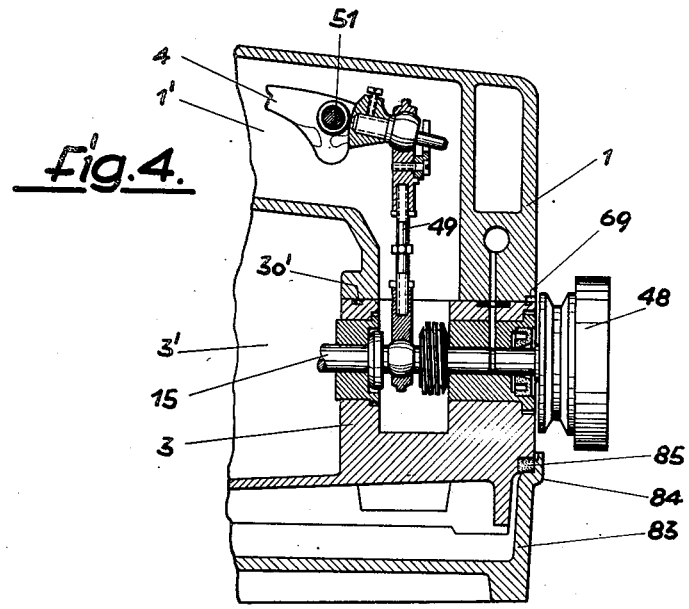
Figure 16:
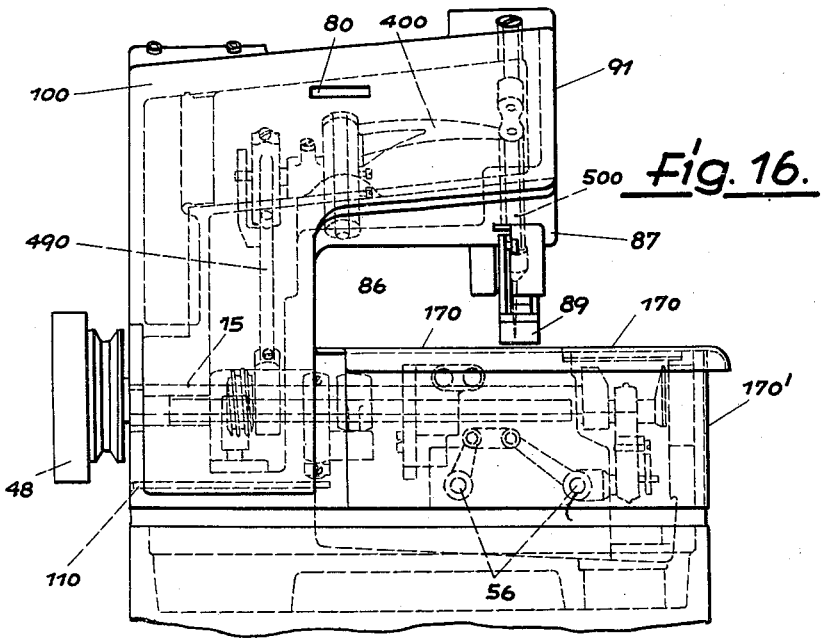
Figure 17:
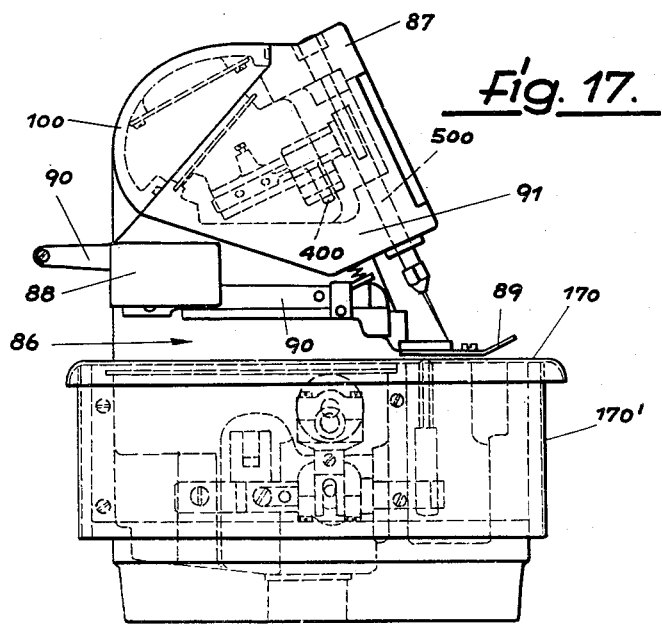

Fig. 3 is a vertical section through the sewing machine along the line III—III in Figs. 1 and 2, Fig. 3a is a perspective view of the detail of a knife and bent plate of Fig. 3, Fig. 4 is a vertical longitudinal section through the driving side of the sewing machine in the axis of main driving shaft, Fig. 5 is a vertical section through the driving end of the sewing machine along the line V—V in Figs. 1 and 2, Fig. 6 is a plan view, partially in sectional view, to the lower section of the casing of the machine with the driving means bedded therein, Fig. 7 is a partial section through the upper part of the sewing machine in an enlarged scale, Figs. 8 and 9 are vertical longitudinal sections through two examples of design of the compartment of the lower section of the casing containing means of operating the loopers, Fig. 8a is a perspective view of a sheet metal plate of Fig. 8, Fig. 10 is a partial front view of the part of the compartment containing means of operating the looper seen in the direction of the arrow X in Fig. 9, Fig. 11 is a vertical longitudinal partial section through the covering of the drive of the feed dog, Fig. 11a is a perspective view of the detail of two plates of Fig. 11, Fig. 12 is a vertical section through the packing between the upper section and the lower section of the casing, Fig. 13 is a partial projection of a part of the feed dog drive, Fig. 14 is a partial projection of the inner surface of the cover showing the canal of labyrinth type, Fig. 15 is a plan view of the end of the lower section of the casing located at the end of it, Figs. 16 and 17 show a view respectively a side view of a modified design of the sewing machine, Fig. 18 is a rear elevation as a machined casting of the empty housing of Figs. 1 and 2, Figs. 19 and 20 are cross sections through the empty housing as machine castings taken on lines XIX—XIX and XX—XX respectively in the direction of the arrows, and Fig. 21 is a side elevation of the lower part of the empty housing in the direction of the arrow 94 of Fig. 6.

The sewing machine consists of an upper section 1 and of a lower section 3 of the casing. In the lower section 3 of the main driving shaft 15 driven by means of the driving pulley 48 is bedded in an appropriate manner. The needlebar 5 axially movably bedded in the upper section 1 of the casing is driven by the main driving shaft 15 by way of a driving rod 49 and a lever 4 mounted at 51 by way of guide 4′. The upper section 1 of the casing is subdivided in two compartments 1′ and 1″ by a partition 92. The upper compartment 1′ has an opening 2, the lower compartment an opening 52. Owing to these openings the driving parts of the sewing machine arranged in the compartments 1′ and 1″ are accessible. The opening 2 of the compartment 1′ is closed by a detachable wall 6 consisting of sheet metal or preferably transparent plastics. This wall 6 is inserted at three sides in grooves 7 whose limit surfaces 8 slope toward the interior of the compartment 1′ so that the oil collecting in the grooves 7 flows off into the interior.

The opening 52 of the compartment 1″ is also separated by a wall 13 which may consist of sheet metal or transparent plastics. The wall 13 is able to be inserted into grooves and appropriately removable toward the top.

The walls 6 and 13 form the inner means by which the openings 2 and 52 are closed. The outer means for a double closing of these openings are formed by a cover 10 linked at 11 to the lower section 1 of the casing so that it can be hinged and, when closed, covers the rear of the sewing machine. The cover 10 is arranged at a distance from the walls 6 and 13, so that between the cover 10 on the one hand and the walls 6 and 13 on the other hand an intermediate space 53 is formed, in which oil can collect which might ooze through in spite of the closing of the compartments 1′ and 1″ with the walls 6 and 13. The lower edge 13′ of the wall 13 is arranged below the adjacent upper edge of the lower section 3 of the casing and at a distance from this upper edge so that oil collecting in the intermediate space 53 or oil condensed from the oil-enriched air can flow toward the interior of the machine. Moreover the upper edge 58 of the lower section of the casing and the adjacent side wall 59 of the lower section of the casing are arranged at this place sloping inward. Owing to this arrangement oil may flow from the intermediate space 53 into the interior of the sewing machine, but no oil can ooze through at this place. The oil drained off toward the interior of the upper section 1' can flow downward through an opening 9 provided in the wall 92.

Between the cover 10 and its bearing surface 54 of the upper section 1 of the casing a packing 12 is inserted which may be provided either in a groove of the cover or in a groove of the upper section 1 of the casing (Fig. 7). The cover is provided with a device of any one type permitting to be held at the upper section 1 of the casing. In Fig. 2 for instance a rotary disk 10' having an ascending taper surface and catching behind a wall 10" of the upper section of the casing.

The lower section 3 of the casing, as will be seen in Figs. 8 and 9, is subdivided by a partition 55 into two compartments 3' and 3". In the partition 55 the main driving shaft 15 is bedded, and in the compartment 3" there is a part of the means which serve for driving the looper shafts 56.

Figs. 8 and 9 show two different examples of design for closing the compartment 3".

In the example of design according to Fig. 8 the compartment 3" is open at the top and at the front side of the sewing machine. For enveloping the parts 57 an angled sheet metal 16 is provided, which represents the inner one of the double means. The top side of the angled sheet metal 16 is arranged sloping toward the interior of the sewing machine, whereas the other side is vertical. Moreover the other side of the sheet metal 16 is inserted removable into grooves sloping toward the interior of the machine and actually the side edges of the sheet metal or cover 16 are carried in grooves 95 as shown in Figs. 19 to 21. At a distance from this angled sheet metal 16 there is the cloth-supporting plate 17' having a vertical wall at the face of the sewing machine. Between the angled sheet metal 16 on the one hand and the cloth-supporting plate 17 as well as its wall 17' an intermediate space 18 is formed. Oil which may get into the intermediate space 18 is drained off due to the rim 58 of the lower section 3 of the casing sloping obliquely toward the interior. Lest oil should ooze through the gap 19 formed between the angled sheet metal 16 and the rim 58 this gap is covered by a sheet metal 20.

The example of design according to Fig. 9 shows a modification of the example of design according to Fig. 8. In the case of the example of design illustrated in Fig. 9 the main driving shaft 15 is not only bedded in the wall 55 but also with its end opposite the driving pulley 48 in a bearing arranged in a detachable wall 22 which closes the compartment 3" at the face of the sewing machine. In this case the compartment 3" must only be covered at the top by a plate 60 being held on its support in an appropriate manner and which may consist of sheet metal or transparent plastics for instance. This plate 60 represents the inner one of the double means. The outer one of the double means is formed by the cloth-supporting plate 17 which may also show a wall 17' vertical to it. The plate 60 can be pressed to its support by a leaf spring 61, for instance. The leaf spring 61 can support itself against the bottom side of the cloth-supporting plate 17.

Fig. 10 shows a partial view of the face of the sewing machine according to the example of design illustrated in Fig. 9 after removing the cloth-supporting plate 17 and its wall 17'. It will be seen that the bearing 21 is covered by a cover 21', and that the wall 22 is fixed at the lower section 3 of the casing by means of screws 62.

The cloth-supporting plate 17 is linked with its one corner to the lower section 3 of the casing pivotally at 63 in the example of design according to Fig. 8 as well as according to Fig. 9. The upper section 1 of the casing does not cover the whole compartment 3' of the lower section 3 of the casing toward the top, but an opening 64, Fig. 20, is provided near the feed bar 26, which is also covered by double means, as particularly illustrated in Fig. 11. For covering the opening 64 an angular sheet metal 25 is provided, the one side of which is fastened at the upper section 1 of the casing by means of screws 65. The horizontal section of the angular sheet metal 25 is provided with dropping rails 28. Above the horizontal side of the angular sheet metal 25 there is the stitch plate 29 being detachable as known in the art. This stitch plate covers the horizontal side 25 of the angular sheet metal and moreover the gap 66 between the one dropping rail 28 and the wall 55 of the lower section 3 of the casing. The angled sheet metal 25 forms the inner means and the stitch plate 29 the outer means of sealing. Adjacent to the angled sheet metal 25 there is a plate 27 having a vertical side 68 which partially covers a gap 67 provided in the upper section of the casing.

As will be seen in Figs. 4, 12 and 15 a double sealing is also provided between the upper section 1 of the casing and the lower section 3 of the casing. The lower section 3 of the casing shows a groove 30, in which an elastic packing 30' is disposed. Parallel to the several sections of the groove 30 a second groove 31 is provided. From several places of this groove 31 canals 32 are conducted into the interior of the lower section of the casing. Whereas the groove 30 represents the inner one of the double means, the groove 31 represents the outer means through which the oil which may still ooze through the adjacent surfaces of the upper section 1 and the lower section 3 of the casing can flow toward the interior of the lower section 3 of the casing. The upper section 1 of the casing has outside above the groove 31 a groove like recess 69 permitting fresh air to enter the interior of the sewing machine from outside through the canals 32.

Moreover it is appropriate to provide further means of preventing the flowing of oil from the casing of the sewing machine. As shown in Fig. 3 a lever 35 is mounted at 70 in the upper section 1 of the casing which is moved up and down by way of the main driving shaft 15 by well-known means which engage to it pivotally at 71. This lever passes through the gap 67 of the upper section 1 of the casing and has a knife 72 outside the casing for cutting the cloth parallel to the seam. This lever 35 is provided behind the gap 67 in the compartment 1" of the upper section 1 of the casing with a bent plate 37 preventing the oozing of oil through the gap 67 and spraying downward the oil received by said plate.

From Fig. 3, furthermore, results that the feed bars 26 are in a well-known way moved up and down by a lifting rocker 45 mounted on the main driving shaft in which they are bedded axially movable. The feed bars 26 support the feed dogs 73 and 74, which are arranged outside the casing. The feed bar 26 is moved longitudinal by way of a swinging head rockshaft 43, the one feed bar 26 being driven directly by it, the other one by way of a wing 44 to which a lever 75 is linked at 76, which by means of an eye 77 is linked to a cross slider 78 being axially movable on the one feed bar 26 and tightly connected with the other feed bar. This drive of the feed bars 26 is well-known. In this case it is only essential that, as illustrated in Fig. 13 in an enlarged scale, the eye 77 is provided with a nose 79 hurling downward the oil received by the lever 75 and the eye 77.

In order to prevent a detrimental heating of the air in the interior of the sewing machine there are air inlets provided in the lower section of the casing and air outlets in the upper section of the casing. It was already mentioned that air can enter the lower section of the casing through the canals 32. Moreover, as can be seen particularly in Fig. 3 the cover 10 is arranged with its lower edge at a distance from the edge 58 of the lower section 3 of the casing so that there occurs an air inlet 38, through which air can enter the lower section 3 of the casing and the intermediate space 53. From the compartment 3' of the lower section 3 of the casing air can freely enter the compartment 1" of the upper section of the casing and from there the compartment 1' of the upper section of the casing through the opening 9 in the partition 92. In order to enable the air to leave this compartment 1' again, the wall 6, as is seen in Figs. 3, 5 and 7, is provided with an opening 39, through which the air can enter the intermediate space.

From the intermediate space 53 the air can get out through an opening 80 provided in the illustrated example at the rear wall of the cover 10, but which may also be provided at a front wall of the same. On this opening 80 a canal of labyrinth type is superposed, through which the heated air must pass, and in which the oil mist carried along with it will deposit. This canal, as results from Fig. 14 particularly, is formed by a wavy-lined groove 40, provided in the wall 10' of the cover reinforced at this place, and by a plate 41 screwed on at the reinforced wall 10' by means of screws 81 (Fig. 7). In the example illustrated in Fig. 14 the ends 40' of the groove 40 in the cover 10 run so that there occur openings. The opening 80 is provided in the middle of the groove 40 so that the air can flow through the canal from either side out of the intermediate space 53 corresponding to the arrows 82, and get out through the opening 80.

It goes without saying that the example of design can also be so arranged that the air enters at the one end of the canal, and the opening 80 is provided at the other end of the canal.

Below the lower section 3 of the casing in a generally known way an oil pan 83 is provided on whose border 84 the lower section 3 of the casing is put. A packing 85 is provided between both of them.

Figs. 16 and 17 illustrate an example of design of the sewing machine, in which the upper section 1 of the casing is designed as an angled arm 87, so that a free passage 86 is formed between the needle-bar 500 and the bar 490 operating the lever 400. In this case the cover 100 linked at 110 has an angled shape. The one face 91 of the upper section of the casing must be provided with a shoulder 88 in which the lever 90 operating the pressure foot 89 is mounted. Moreover, the cloth-supporting plate 170 extends in this example of design up to the passage 86, where it is linked to one corner. The wall 170' vertical to the cloth-supporting plate 170 extends round the outside of the casing in an appropriate width.

The means of conducting oil under pressure to the parts of the sewing machine to be lubricated are marked with 93.

What I claim is:

1. A sewing machine, comprising a casing consisting of an upper section and a lower section connected with each other and one above the other, a main driving shaft rotatably mounted in the lower section of the casing and provided with a driving pulley, a needle-bar axially movable and mounted in the upper section of the casing, means for operating the needle-bar from and connected to the main driving shaft, a rear wall of the casing having upper and lower spaced openings formed therein for substantially the entire length thereof, separate means closing the openings of the two sections of the casing comprising a pair of continuous wall members confining thereby any oil and oil mist hurled toward said openings from any moving parts of the sewing machine outward and back into a bottom of the casing, and a cover movably secured to one of the sections and extending in spaced relation with the closing means along the casing over the rear thereof, the separate closing means for the lower section having an inward sloping bottom part in the lower end thereof so that any oil in the space between the cover and the closing means may flow back into the bottom of the casing.

2. A sewing machine according to claim 1, in which the closing means for the lower opening extends below the lower end of the cover.

3. A sewing machine according to claim 1, in which the cover is provided with sealing means along the edges thereof to contact the casing for a tight fit to prevent leakage of oil.

References Cited in the file of this patent

UNITED STATES PATENTS

| | | |
|---|---|---|
| 2,013,884 | Goldwyn et al. | Sept. 10, 1935 |
| 2,120,210 | Clayton | June 7, 1938 |
| 2,314,350 | Haas | Mar. 23, 1943 |
| 2,627,829 | Wallenberg et al. | Feb. 10, 1953 |
| 2,679,219 | Hess | May 25, 1954 |